Feb. 19, 1952   J. W. COLTMAN ET AL   2,586,304
PROTECTION OF PHOSPHORS FROM ATTACK BY ALKALI VAPORS
Filed June 12, 1948

WITNESSES:

INVENTORS
John W. Coltman and
Richard L. Longini.
BY
ATTORNEY

Patented Feb. 19, 1952

2,586,304

UNITED STATES PATENT OFFICE 2,586,304

PROTECTION OF PHOSPHORS FROM ATTACK BY ALKALI VAPORS

John W. Coltman and Richard L. Longini, Pittsburgh, Pa., assignors to Westinghouse Electric Corporation, East Pittsburgh, Pa., a corporation of Pennsylvania Application June 12, 1948, Serial No. 32,586

8 Claims. (Cl. 250—80)

Our invention relates to radiation-emitting screens and, in particular, relates to a process for making light-emitting screens for use in electrical discharge tubes in which electron images corresponding to a light image are first produced, and then a second light image which is an intensified replica of the initial light image is produced by incidence of the electrons on a fluorescent screen. Certain subject matter herein disclosed is claimed in our copending application Serial No. 149,122, filed March 11, 1950, and assigned to our present assignee.

One example of an electrical discharge device of this type is shown and claimed in Lloyd P. Hunter and Richard Longini application, Serial No. 771,112, for an Image Intensifier, filed August 28, 1947, now Patent No. 2,555,545. In the device just mentioned, an electron image is produced as a replica of an X-ray picture on fluorescent screen; the electrons are then accelerated to high velocity and into incidence upon a screen comprising a phosphor capable of excitation by cathode rays, hereafter called an electron phosphor, and the light image produced on the latter is observed. In the electrical discharge tube just described, the photoelectric surface comprises materials such as cesium which during processing have a vapor of a substantial pressure and there is likelihood that chemical reaction will occur between the photoelectric components and those of the screen. It is, accordingly, necessary to provide some protective coating capable of preventing this reaction.

One object of our invention is, accordingly, to provide a novel type of fluorescent screen in which the fluorescent material is provided with a coating which is substantially transparent to incident electrons and is capable of preventing chemical reaction between the phosphor of the screen and cesium vapor.

Another object of our invention is to provide a protective coating for the particles comprised in a fluorescent screen which shall prevent chemical reaction between them and vapors present in the space around them.

Still another object of our invention is to provide an improved form of electron phosphor screen in which chemical reaction between the phosphor and an environing atmosphere is prevented.

A still more specific object of our invention is to provide a method of protecting zinc cadmium sulphide phosphor from chemical reaction with the vapor of photo-electrically active materials.

A still further object of our invention is to provide a method of preventing chemical reaction between electron phosphors of the zinc sulphide type with the components of a cesiated antimony located in a common container therewith.

Other objects of our invention will become apparent upon reading the following description, taken in connection with the drawing, in which.

Figure 1:
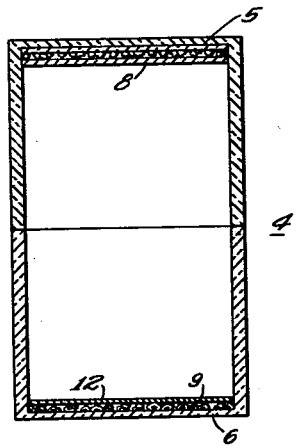
Figure 1 shows a view in longitudinal section of an electrical discharge tube containing an electron phosphor screen protected in accordance with the principles of our invention.
Figure 2:
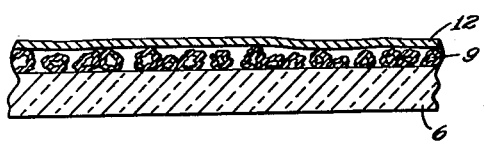
Fig. 2 is a view in section of the screen forming a wall portion of Fig. 1.
Figure 3:
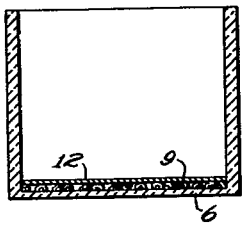
Fig. 3 is a sectional view of the lower portion of the tube of Fig. 1 at an intermediate point of its fabrication.

Referring in detail to the drawing, the electron phosphor screen, in accordance with our invention, comprises a thin layer 9 made up of particles of an electron phosphor, such, for example, as zinc cadmium sulphide, which is deposited on a portion of the wall 6 of a container 4 of glass or other suitable material. The container 4 may be a vacuum-tight enclosure, such as the tube 4 in the above-mentioned Hunter and Longini application. As is illustrated in said application, the enclosure 4 may contain, during processing of the tube 4, a substantial pressure of the vapor of some material, such, for example, as the cesium component of a layer 8 of cesiated antimony located on a fluorescent screen 5 in the container 4. As has been stated above, there is a likelihood of chemical reaction, during processing of the tube 4, between the electron phosphor of the layer 9 and the above-mentioned vapor, and to prevent such undesired chemical reaction, each particle of the phosphor layer 9 is protected by a coating of a substance chemically inert to the components of the photoelectric layer 8, this coating being applied in a manner about to be described.

The electron phosphor, e. g. silver-activated zinc cadmium sulphide, is first prepared by methods well known in the chemical art in the form of particles averaging the desired size, e. g. three microns in diameter, and these are placed in some device such as a rotating drum which agitates the phosphor and continuously exposes new surfaces to the space above it. A coating is then applied by spraying, evaporating, or sputtering the entire phosphor area which is exposed. Since this surface is constantly being changed, it is possible, with suitable geometric arrangement, to apply approximately uniform layers of material to all surfaces of the phosphor crystals. An obvious essential to the proper operation of this process is that the particles remain free of each other and of the tumbling drum at all times during the operation in order that all surfaces of each particle shall eventually be exposed to the evaporating material. If a good insulator such as silica were evaporated onto the phosphor, the particles become charged electrically and no longer tumble freely. As a result, some surfaces would be covered thickly and others not at all. It is, therefore, necessary to evaporate a semi-conducting or conductive material.

Highly insulating transparent coatings such as chromium oxide, zinc oxide, aluminum oxide, etc., for the particles can be formed successfully by evaporating chromium, zinc, or aluminum, etc., on the phosphor particles first. During this period they cannot, of course, become statically charged, and will therefore be free to roll. After the evaporation or sputtering, the particles can be exposed to an oxidizing means such as air or oxygen under suitable conditions (in a furnace, in an electrolytic bath, etc.) to form the protective transparent, non-metallic layer of the oxide. The individually protected phosphor particles are then ready for use. This oxide layer should be thin enough to be sufficiently transparent.

It will be clear to those skilled in the art that other metals than chromium, zinc, and aluminum may be used, and that other compounds than oxides of metals, e. g. fluorides, may be sufficiently inert chemically, protective, and sufficiently transparent to be useful for the herein-described purposes.

The phosphor particles may be deposited to form the layer 9 upon the wall portion 6 by producing a mixture or suspension in a water solution containing about 2% by weight of potassium silicate. The suspension may comprise about one milligram of the electron phosphor per cubic centimeter of the liquid, and this suspension or mixture may be poured to form a layer of a predetermined depth in the container 4 at an early stage of manufacture of the latter before it is assembled into the complete electron discharge tube of which it is later to form a part. The amount of suspension poured into the container 4 should correspond with the thickness of the phosphor layer ultimately desired; for example, we have found for many purposes that the suspension may be poured into the container 4 to a depth of two centimeters. The container 4 is then allowed to stand for a sufficient time so that the phosphor settles in the container to form a uniform layer all over the bottom thereof. When this has occurred, the supernatant liquid may be carefully siphoned off or even poured off, very slowly so as not to disturb the phosphor layer on the wall 6. After most of the supernatant liquid is thus removed, the layer may be allowed to dry by evaporation and be subsequently baked for thirty minutes at about 130° C. and thereafter for another thirty minutes at about 350° C. This will form a satisfactorily uniform layer of the phosphor over the wall portion 6.

As is pointed out in the Hunter and Longini application mentioned above, it is frequently desired to prevent emission of light to the photoelectric layer 8 from the phosphor layer 9 by a thin layer 12 of aluminum or the like which may be deposited on it from the vapor phase by well-known procedures. A suitable procedure is described in application Serial No. 36,958 of W. J. Hushley and W. M. Siebert for Protection of Phosphors From Attack by Alkali Vapors which claims certain subject matter herein disclosed and is now Patent No. 2,533,809. The layer 12 is thin enough to be pierced without substantial loss of energy by the electrons incident upon it. The container 4 with the phosphor layer 9 thus installed may thereafter be assembled into a complete electrical discharge tube or other device by methods too well known in the glass blowing art to require description here.

While we have described the support 6 on which the phosphor particles 9 are deposited as a portion of the wall of tube 4, it will be noted that the support 6 may be a separate plate of glass or other suitable material on which the above-described process of depositing the phosphor layer 9 may be carried out by laying it on the bottom of a suitable container. The resulting screen may then be installed in a vacuum-tight container such as 4 when desired.

We claim as our invention:

1. An electron discharge tube comprising a vacuum-tight container having a light-emitting screen comprising particles of an electron phosphor each enveloped by coating of a metallic oxide individual to it.

2. An electron discharge tube comprising a vacuum-tight container having a light-emitting screen comprising particles of zinc sulphide each enveloped by a coating drawn from the group of materials consisting of aluminum oxide and chromium oxide.

3. A vacuum-tight container containing a surface coated with photoelectric material and another surface comprising an electron phosphor consisting of particles each enveloped by a coating of a metallic compound individual to it and which is chemically inert to the components of said photoelectric material.

4. A vacuum-tight container containing a surface coated with photoelectric material and another surface comprising zinc sulphide type phosphor particles individually enveloped by a coating drawn from the group of materials consisting of aluminum oxide, zinc oxide and chromium oxide.

5. A vacuum-tight container enclosing an atmosphere containing at some time a substantial pressure of cesium and having a screen comprising an electron phosphor consisting of particles individually enveloped within a metallic compound which is chemically inert to cesium.

6. A vacuum-tight container enclosing an atmosphere containing at some time a substantial pressure of cesium and having a screen comprising zinc sulphide particles individually enveloped within a protective layer drawn from the group of materials consisting of aluminum oxide, zinc oxide and chromium oxide.

7. A vacuum-tight container enclosing an atmosphere containing a substantial pressure of cesium and having a screen comprising an electron phosphor consisting of particles individually enclosed in a metallic compound which is chemically inert to cesium.

8. A vacuum-tight container enclosing an atmosphere containing a substantial pressure of cesium and having a screen comprising zinc sulphide particles individually enclosed within a protective layer drawn from the group of materials consisting of aluminum oxide, zinc oxide and chromium oxide.

JOHN W. COLTMAN.
RICHARD L. LONGINI.

REFERENCES CITED

The following references are of record in the file of this patent:

UNITED STATES PATENTS

| Number | Name | Date |
| --- | --- | --- |
| 2,120,916 | Bitner | June 14, 1938 |
| 2,143,095 | Thomas | Jan. 10, 1939 |
| 2,149,849 | Lubszynski et al. | Mar. 7, 1939 |
| 2,151,496 | Beese | Mar. 21, 1939 |
| 2,226,567 | Le Van | Dec. 31, 1940 |
| 2,303,563 | Law | Dec. 1, 1942 |
| 2,374,311 | Schaefer | Apr. 24, 1945 |
| 2,446,617 | Stalhane | Aug. 10, 1948 |